(12) United States Patent
Obrecht et al.

(10) Patent No.: US 10,961,981 B2
(45) Date of Patent: Mar. 30, 2021

(54) CONTROL FOR A WIND TURBINE

(71) Applicant: Siemens Gamesa Renewable Energy A/S, Brande (DK)

(72) Inventors: John M. Obrecht, Louisville, CO (US); Karsten Schibsbye, Fredericia (DK)

(73) Assignee: Siemens Gamesa Renewable Energy A/S, Brande (DK)

( * ) Notice: Subject to any disclaimer, the term of this patent is extended or adjusted under 35 U.S.C. 154(b) by 560 days.

(21) Appl. No.: 15/561,120

(22) PCT Filed: Mar. 27, 2015

(86) PCT No.: PCT/US2015/022893
§ 371 (c)(1),
(2) Date: Sep. 25, 2017

(87) PCT Pub. No.: WO2016/159927
PCT Pub. Date: Oct. 6, 2016

(65) Prior Publication Data
US 2018/0128242 A1 May 10, 2018

(51) Int. Cl.
*F03D 7/04* (2006.01)
*F03D 7/02* (2006.01)

(52) U.S. Cl.
CPC .............. *F03D 7/046* (2013.01); *F03D 7/024* (2013.01); *F03D 7/0224* (2013.01); *F03D 7/043* (2013.01);
(Continued)

(58) Field of Classification Search
CPC ........ F03D 7/0224; F03D 7/024; F03D 7/043; F03D 7/046; F05B 2260/74;
(Continued)

(56) References Cited

U.S. PATENT DOCUMENTS 8,622,698 B2 * 1/2014 Kristoffersen ........ F03D 7/0224
290/44
10,451,035 B2 * 10/2019 Zinnecker ............. F03D 7/0224
(Continued)

FOREIGN PATENT DOCUMENTS

CN          101509468 A     8/2009
CN          101881254 A    11/2010
(Continued)

OTHER PUBLICATIONS

International Search Report dated Dec. 1, 2015, for PCT/US2015/022893.

*Primary Examiner* — Carl C Staubach
(74) *Attorney, Agent, or Firm* — Wolter Van Dyke Davis, PLLC

(57) ABSTRACT

A method of controlling a wind turbine having a nacelle, a rotor, a rotating hub, a first rotor blade and at least a second rotor blade, both rotor blades being mounted to the hub. The method includes measuring the strain in the first rotor blade by a strain measurement device attached to the first rotor blade; and choosing the operational parameters of the wind turbine based on the measured strain such that fatigue damage of the second rotor blade is reduced. A wind turbine is controlled by such a method.

12 Claims, 9 Drawing Sheets

(52) U.S. Cl.
CPC ..... *F05B 2260/74* (2013.01); *F05B 2260/821* (2013.01); *F05B 2260/8211* (2013.01); *F05B 2270/1095* (2013.01); *F05B 2270/326* (2013.01); *F05B 2270/327* (2013.01); *F05B 2270/328* (2013.01); *F05B 2270/331* (2013.01); *F05B 2270/404* (2013.01); *F05B 2270/808* (2013.01); *Y02E 10/72* (2013.01)

(58) Field of Classification Search
CPC ........ F05B 2260/821; F05B 2260/8211; F05B 2270/1095; F05B 2270/326; F05B 2270/327; F05B 2270/328; F05B 2270/331; F05B 2270/404; F05B 2270/808; Y02E 10/723
See application file for complete search history.

(56) References Cited

U.S. PATENT DOCUMENTS

| | | | |
|---|---|---|---|
| 2009/0021015 A1* | 1/2009 | Pedersen | F03D 7/0292 290/44 |
| 2009/0206605 A1 | 8/2009 | Schmidt | |
| 2009/0246019 A1* | 10/2009 | Volanthen | F03D 80/40 416/1 |
| 2010/0014969 A1* | 1/2010 | Wilson | F03D 7/0224 416/1 |
| 2010/0283245 A1 | 11/2010 | Gjerlov et al. | |
| 2011/0040497 A1* | 2/2011 | Olesen | F03D 7/042 702/34 |
| 2011/0137586 A1* | 6/2011 | Jiang | F03D 17/00 702/56 |
| 2011/0158806 A1* | 6/2011 | Arms | F03D 1/0658 416/31 |
| 2014/0086747 A1 | 3/2014 | Perley et al. | |
| 2014/0178197 A1* | 6/2014 | Risager | F03D 7/0224 416/1 |

FOREIGN PATENT DOCUMENTS

| | | |
|---|---|---|
| CN | 101925795 A | 12/2010 |
| CN | 103384764 A | 11/2013 |
| CN | 203756432 U | 8/2014 |
| DE | 102010027229 A1 | 1/2012 |
| WO | 2007104306 A1 | 9/2007 |
| WO | 2008041066 A1 | 4/2008 |
| WO | 2009095025 A1 | 8/2009 |
| WO | 2010016764 A1 | 2/2010 |
| WO | 2010080391 A2 | 7/2010 |
| WO | 2012083958 A2 | 6/2012 |

* cited by examiner

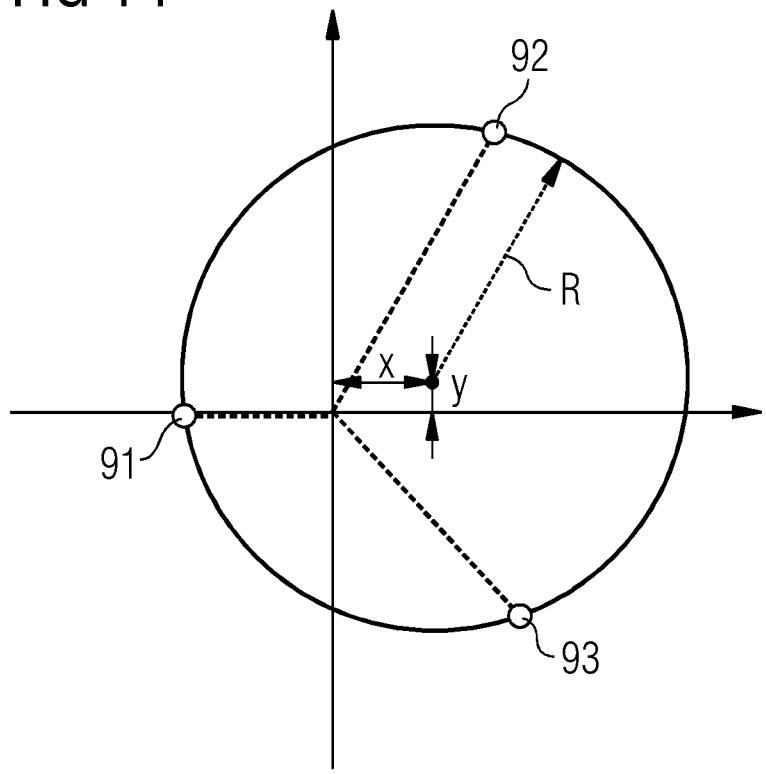

CONTROL FOR A WIND TURBINE

CROSS REFERENCE TO RELATED APPLICATIONS

This application is the U.S. National Stage of International Application No. PCT/US2015/022893 filed Mar. 27, 2015, and claims the benefit thereof and incorporated by reference herein in its entirety.

FIELD OF INVENTION

The present invention relates to a method of controlling a wind turbine such that the performance of the wind turbine is optimized. Furthermore, the invention relates to a wind turbine which is controlled by such a method.

BACKGROUND OF INVENTION

Local variations in the atmosphere may cause large fatigue loads, a reduced aerodynamic efficiency and/or an increased acoustic noise emission of a wind turbine. Local variations in the atmosphere are also known as local "hot spots" and may be caused by gusts, yaw, or high wind shear and veer. Such a time varying, heterogeneous wind field is becoming more and more relevant with increasing size of the wind turbines. In particular, the size of the swept area of the rotor blades, which refers to the area that is covered during a rotation of the rotor, has become larger and larger in recent years.

Current methods to determine the wind field in the swept area are expensive and/or inaccurate. Consequently, large margins of safety with regard to fatigue load lifetimes, aerodynamic stall margins and noise margins are incorporated and provided in the state of the art. The incorporation of large safety margins, however, decreases the product value for the wind turbine via over-design of the product. In other words, it may be formulated that the value of the wind turbine decreases with increased designated safety margins.

As an example for a relatively complex method of controlling a wind turbine, the international patent application WO 2012/083958 is mentioned. In this method, the rotor plane is divided in a number of sectors, individual sectors for each rotor blade are determined by an azimuth angle sensor and blade sensor data are obtained and interpreted accordingly.

It is, however, desirable to provide a simple and cost efficient concept to reduce the fatigue damage of the rotor blades of a wind turbine.

SUMMARY OF INVENTION

This objective is solved by the independent claims. The dependent claims relate to advantageous embodiments and developments of the invention.

According to the invention, there is provided a method of controlling a wind turbine comprising a nacelle, a rotor, a rotating hub, a first rotor blade and at least a second rotor blade, both rotor blades being mounted to the hub. The method comprises the following steps: —measuring the strain in the first rotor blade in a first angular position within the rotor plane by means of a strain measurement device attached to the first rotor blade, and —changing the orientation of the second rotor blade with regard to the direction of the impinging airflow such that the fatigue damage which is generated by the interaction between the second rotor blade and the airflow impinging on the second rotor blade is reduced.

A wind turbine refers to a device that can convert wind energy, i.e. kinetic energy from wind, into mechanical energy, which is subsequently used to generate electricity. A wind turbine is also denoted a wind power plant.

The wind turbine comprises at least a first rotor blade and a second rotor blade. In particular, the wind turbine comprises exactly three rotor blades.

Strain in a rotor blade can be understood as the structural reaction of the blade to external forces, such as aerodynamic, gravitational, centrifugal, or inertial forces. As soon as there is a relative change between the ambient air and the rotor blade, reaction forces subsequently change on the rotor blade. These forces are measured as strain in the rotor blade. Strain in the rotor blade is a result of bending of the rotor blade characterized by a bending moment. It is a common technique to measure such bending of the rotor blade by means of strain measurement devices such as a strain gauge.

Additionally, the rotational speed of the rotor may advantageously be determined. This is advantageously carried out at the same time as the strain measurement in the first rotor blade takes place. Alternatively, the rotational speed of the rotor is determined slightly before or slightly after the strain measurement.

Given the common variations of the rotational speed compared to the time that one rotor blade needs for one revolution, one instantaneous measurement of the rotational speed gives a sufficient precision for most applications. Alternatively, an average value for the rotational speed may be taken as well.

After determining the rotational speed of the rotor, the expected time needed by the second rotor blade to reach the position at which the first rotor blade was situated at the time of the strain measurement is calculated. This can easily be carried out by considering the angle between the first and the second rotor blade in the rotor plane. As an example, for a conventional three-bladed wind turbine, this angle is 120 degrees. Thus, assuming that the second rotor blade is the rotor blade which is immediately lagging with regard to the first rotor blade in which the strain measurement is carried out, and assuming exemplarily a rotational speed of five revolutions per minute, the expected time span after which the second rotor blade travels through the position of the first rotor blade is four seconds.

Note that the measured strain values can directly be taken in order to choose the operational parameters of the wind turbine, such as pitching one or several rotor blades, yawing the nacelle or the like.

Alternatively, the measured strain values may be transformed into a wind speeds, for instance by means of a controller. The controller may be integrated into the strain measurement device or may be separated from the strain measurement device. If the controller is separated from the strain measurement device, the controller may be located at the rotor blade, the hub or the nacelle of the wind turbine. Any other suitable position for locating the controller is possible as well.

The calculation from the measured strain values (or strain distribution) into the wind speed distribution is carried out by a suitable algorithm.

The calculation from the measured strain value distribution to the wind speed distribution may be performed by a look-up table or by a computed fit function, such as from a neural network or the like.

Based on the measured strain (either directly taking these strain values of taking the calculated wind speeds as described above), the operational parameters of the wind turbine are chosen such that the fatigue damage of the second rotor blade is reduced.

Note that it may be the controller itself which subsequently gives commands to the suitable components of the wind turbine in order to perform the operational changes for optimization of the performance of the wind turbine.

Thus, a key aspect of the present invention is that an efficient, i.e. an inexpensive and reliable, concept is provided how the fatigue damage of a rotor blade may be reduced. This has the effect that large safety margins can be avoided. In other words, the safety margins related to fatigue loads and/or aerodynamic stall and/or noise emission are decreased. The efficiency potential of the wind turbine is thus better exploited.

In an embodiment of the invention, the method comprises the further steps of—transmitting data relating to the measured strain values to the controller; and—calculating the angular distribution and the intensity of the strain by means of the controller.

In other words, the measured strain values are sent from the strain measurement device to the controller. Advantageously, this can be done by optical fibers. Alternatively, electrical cables or the like are also possible for transmission of the data. Yet another alternative is the wireless transmission of the strain measurement value data to the controller. The wind speed distribution contains information of the spatial distribution of the wind speed and the intensity of the wind speed. This is based on the angular distribution and the intensity of the strain as determined by the controller.

In another embodiment, the choice of operational parameters includes pitching of the second rotor blade.

Thus, after calculating the wind speed distribution at the rotor plane, the controller might consider and recommend pitching of one or several of the rotor blades. It is particularly advantageous if any information that is received and obtained by measurement of the strain on a first rotor blade is used to adapt the angle of attack of a trailing or lagging rotor blade. Thus, a feed-forward regulation mechanism is established. If the trailing rotor blade is specifically modified regarding its pitch angle one refers to individual pitching.

Thus, by a simple and inexpensive strain measurement on a first rotor blade the second rotor blade can be pitched more optimally, such that the overall performance of the wind turbine is increased. This of course implies that the local variation of the wind field stays substantially stable and constant during a time which is greater than the time that it needs for the second rotor blade to move to the position where the first rotor blade was positioned during measurement of the strain.

In another embodiment, the choice of operation of parameters includes yawing the nacelle.

This is advantageous in the case that there is no local increase of wind speed at a certain part of the swept area of the rotor blades but that a substantial fraction of the swept area is confronting the rotor blades in a non-optimal way. In another embodiment, the optimization of the performance of the wind turbine includes increasing the electrical power generated by the wind turbine.

Thus, the annual energy production for the wind turbine can be increased. Alternatively, it is also possible to keep the electrical power that is generated substantially stable, but, for example, to reduce extreme and/or fatigue loads and/or to reduce noise that is emitted by the rotor blade and the airflow impinging on the rotor blade. Indirectly, this also leads to a performance increase of the wind turbine.

In an advantageous embodiment, a plurality of strain measurement devices are arranged along the span of the first rotor blade, namely between the root portion of the first rotor blade and the tip portion of the first rotor blade.

This allows that the strain in the rotor blade is not only measured at one specific radial position of the rotor blade, but at various radial positions. As a consequence, the wind speed can be determined not only with angular resolution but also with radial resolution.

Thus, advantageously, the method comprises the further step of calculating the radial distribution and the intensity of the strain by means of the controller, such that a determination of the wind field across the swept area of the rotor blades can be obtained.

In other words, the wind speed distribution could also contain information with regard to the radial position within the rotor plane. For this information to be provided one single strain measurement device is generally not sufficient. If the wind speed distribution shall also contain information and a resolution in radial direction, a plurality or continuum of strain measurement devices which are positioned at different radial positions are necessary. The measurement and analysis is slightly more complicated, but the information and data is more detailed and more valuable.

Advantageously, the wind speed distribution in the rotor plane of the rotor blades is not only obtained based on the measured strain values and the actual position of the first rotor blade, but on the measured strain values and the actual positions of the first rotor blade and the second rotor blade. This allows for a more rapid and/or more detailed calculation of the wind field.

In yet another advantageous embodiment, the initial positions of all rotor blades of the wind turbine are determined; the strain in all rotor blades of the wind turbine are measured by respective strain measurement devices attached to each of the rotor blades; and the wind speed distribution in the rotor plane of the rotor blades is calculated by means of the controller, based on the measured strain values.

The simultaneous measurement of the strain in all rotor blades, e.g. three rotor blades, of the wind turbine has the advantage that a more rapid and/or a more detailed wind field can be obtained.

The invention is also directed towards a wind turbine comprising a nacelle, a rotor, a rotating hub, a first rotor blade and at least a second rotor blade, both rotor blades being mounted to the hub, and means for determining the rotational speed of the rotor. Furthermore, the wind turbine comprises a strain measurement device which is attached to the first rotor blade for measuring the strain in the first rotor blade. Additionally, the wind turbine may comprise means for calculating the expected time needed by the second rotor blade to reach the position of the first rotor blade, wherein the calculation is based on the determined rotational speed of the rotor and the angle between the first rotor blade and the second rotor blade. Furthermore, the wind turbine comprises means for choosing the operational parameters of the wind turbine based on the measured strain such that fatigue damage of the second rotor blade is reduced.

In other words, the proposed wind turbine differs from conventional wind turbines in that it comprises at least one strain measurement device attached to the first rotor blade and means for reducing fatigue damage of the second rotor blade.

In an embodiment of the invention, the strain measurement device is arranged in the root portion of the first rotor blade.

The root portion of the rotor blade is referred to the part of the rotor blade which is arranged and prepared for being mounted to the hub of the rotor blade. Opposite to the root portion of the rotor blade is the tip portion of the rotor blade. An advantage of arranging the strain measurement device at the root portion is that space is readily available at the root portion. Advantageously, the strain measurement device is integrated in the shell of the rotor blade or is integrated and attached to the inner surface of the shell.

In another advantageous embodiment, a plurality of strain measurement devices is arranged along the span of the first rotor blade between the root portion of the first rotor blade and the tip portion of the first rotor blade.

This has the advantage that the strain is measured at different radial positions along the rotor blade. Thus, additional information about the wind field is obtained. Consequently, not only information regarding the angular distribution of the wind speed is obtained but additionally information relating to the radial distribution of the wind speed in the rotor plane of the rotor blades is obtained.

In another embodiment of the invention, the strain measurement devices are connected via optical fibers or via a wireless connection with each other and/or with the controller. This allows for a minimal impact on the existing design and structure of the rotor blade.

Finally, the invention relates to a wind turbine which is controlled by one of the described methods of controlling a wind turbine.

It should be mentioned that features which have been described in respect to the method also apply to the wind turbine as such and vice versa.

BRIEF DESCRIPTION OF THE DRAWINGS

Embodiments of the invention are now described, by way of example only, with reference to the accompanying drawings, of which:

FIG. 14 shows the root bending moment of another non-uniform airflow in polar coordinates.

DETAILED DESCRIPTION OF INVENTION

Figure 1:
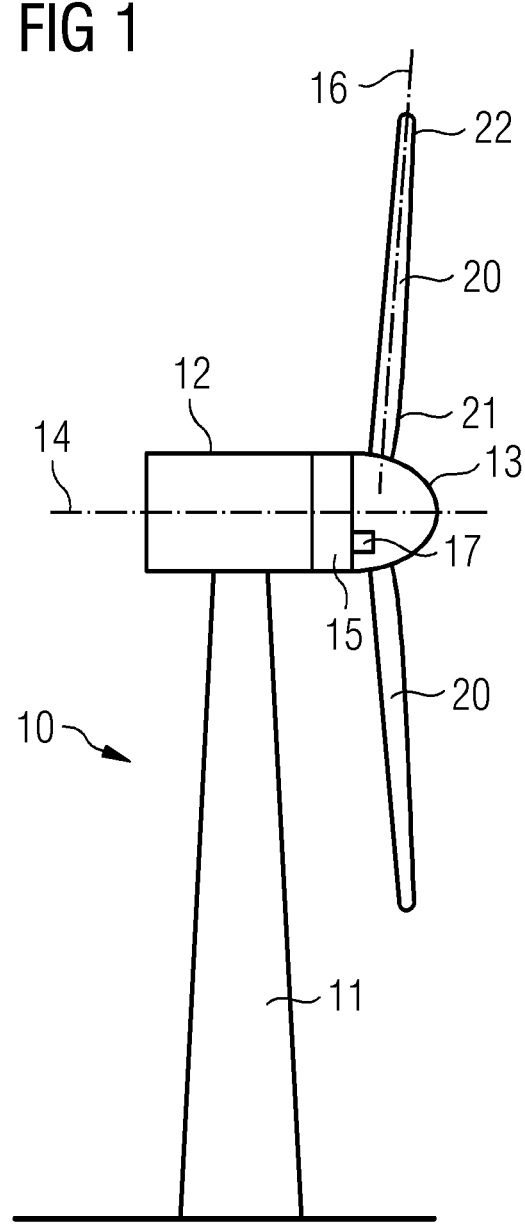
FIG. 1 shows a wind turbine with a controller for reducing fatigue damage on the rotor blades of the wind turbine.

The illustration in the drawings is in schematic form. It is noted that in different figures, similar or identical elements may be provided with the same reference signs.

In FIG. 1, a wind turbine 10 is shown. The wind turbine 10 comprises a nacelle 12 and a tower 11. The nacelle 12 is mounted at the top of the tower 11. The nacelle 12 is mounted rotatable with regard to the tower 11 by means of a yaw bearing. The axis of rotation of the nacelle 12 with regard to the tower 11 is referred to as the yaw axis.

The wind turbine 10 also comprises a hub 13 with three rotor blades 20 (of which two rotor blades 20 are depicted in FIG. 1). The hub 13 is mounted rotatable with regard to the nacelle 12 by means of a main bearing. The hub 13 is mounted rotatable about a rotor axis of rotation 14.

The wind turbine 10 furthermore comprises a main shaft, which connects the hub 13 with a rotor of a generator 15. The hub 13 is connected directly to the rotor, thus the wind turbine 10 is referred to as a gearless, direct drive wind turbine. As an alternative, the hub 13 may also be connected to the rotor via a gearbox. This type of wind turbine is referred to as a geared wind turbine.

The generator 15 is accommodated within the nacelle 12. It comprises the rotor and a stator. The generator 15 is arranged and prepared for converting the rotational energy from the rotor into electrical energy.

Additionally, the wind turbine 10 comprises a controller 17 which is arranged within the hub 13.

Figure 2:
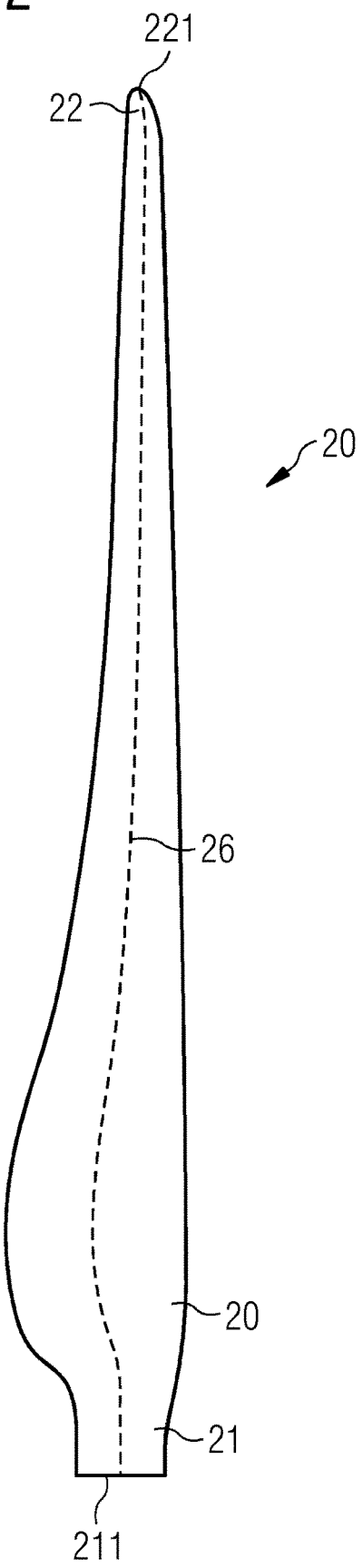
FIG. 2 shows a rotor blade of a wind turbine.

FIG. 2 shows a rotor blade 20 of a wind turbine. The rotor blade 20 comprises a root section 21 with a root 211 and a tip section 22 with a tip 221. The root 211 and the tip 221 are virtually connected by the span 26 which follows the shape of the rotor blade 20.

Figure 3:
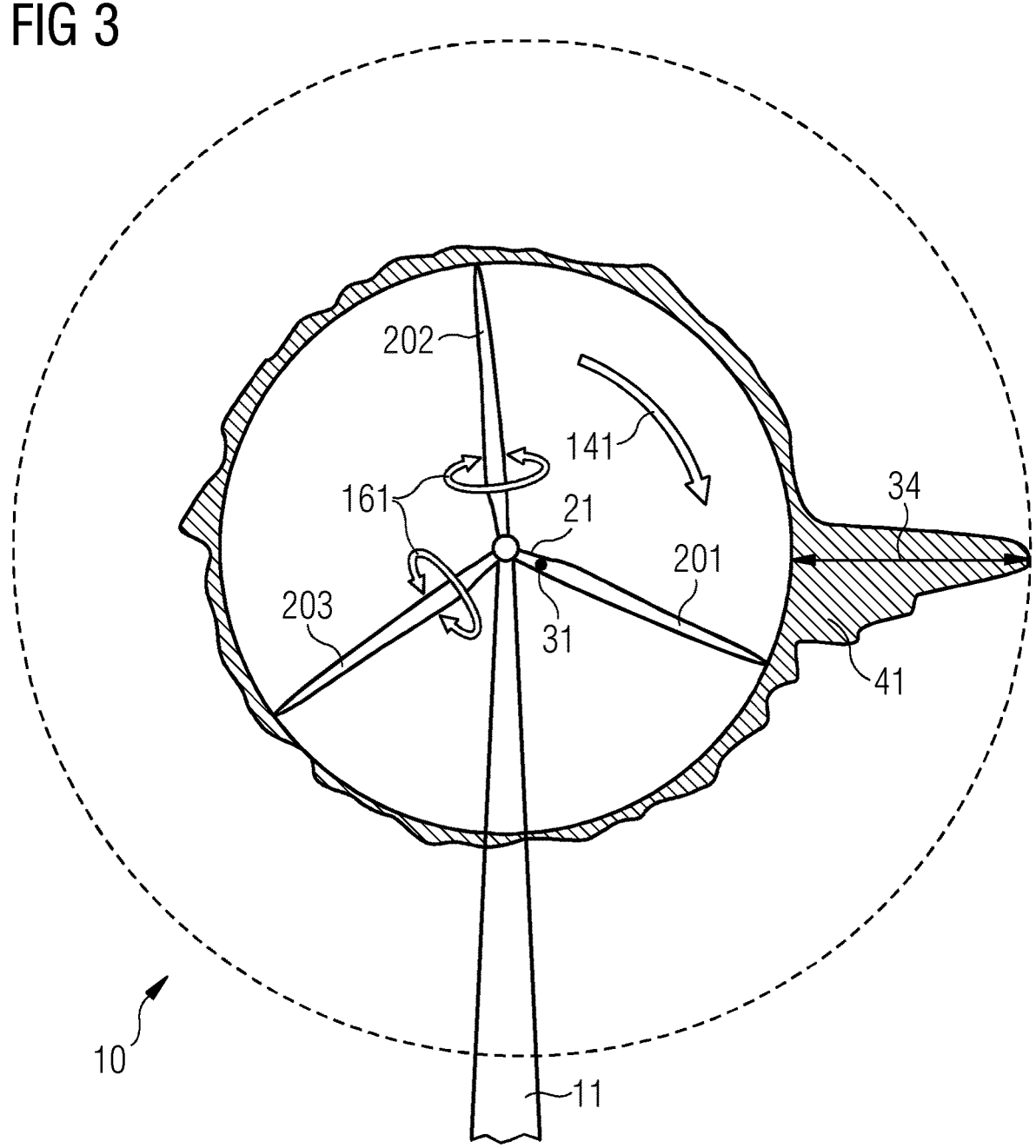
FIG. 3 shows a wind turbine with a strain measurement device arranged at the root portion of one of the rotor blades and a calculated corresponding wind field.

FIG. 3 shows a wind turbine 10 comprising a first rotor blade 201, a second rotor blade 202 and a third rotor blade 203. All three rotor blades 201, 202, 203 can be pitched about respective pitch axes. These pitch axes coincide substantially with the respective longitudinal axes of the rotor blades. The first rotor blade 201 comprises a strain measurement device 31 at its root section 21. The strain measurement device 31 can be a conventional strain gauge, a fiber-optic strain gauge, or a continuous-medium strain gauge. The strain gauge is capable to measure the strain in the rotor blade. If the rotor blade rotates in the direction of rotation of the rotor 141, the strain in the first rotor blade 201 might change due to the fact that the first rotor blade 201 moves across different areas where different wind speeds are present. Note that the change of the strain that is experienced by the first rotor blade 201 is not due to a time variation of the wind speed, but due to the fact that the wind speed is different at different positions across the swept area of the rotor blades. After one full rotation of the rotor a picture of the wind speeds is obtained by the strain measurements performed on the first rotor blade 201 and subsequent calculation from the strain values into a wind speed distribution. A picture of the wind speed field can also be obtained more quickly (in 1/N rotations) with a plurality of N rotor blades, each of the N rotor blades being equipped with at least one strain measurement device. Note, however, that the wind speed is only obtained retrospectively.

If an anomalous wind, for instance an unusually high wind speed is measured at a certain angular position by the strain measurement device 31, this is an indication of a local variation such as a "hot spot" in the wind field of the wind turbine. Regarding the optimal angle of attack of the rotor blades, the measurement obtained by the strain measurement device located on the first rotor blade 201 comes too late to change anything for the first rotor blade 201. However, the information about the local variation of the wind field can be used for the second rotor blade 202 and for the third rotor blade 203, and so on for subsequent rotation. Typically, the trailing, or lagging, rotor blade passes the location of the leading rotor blade a few seconds after the leading rotor blade has passed through it. These few seconds, i.e. for example two to five seconds are sufficient that the controller induces a change of the pitch angle of the trailing rotor blade. Thus, a feed-forward control mechanism is obtained for optimizing the performance of the wind turbine.

FIG. 3 shows an example of a wind field 41 as obtained by the proposed measurement method. The height of the illustrated wind speed or signal strength in FIG. 3 describes the level of intensity of the wind speed 34 which is referred to as the angular level of wind speed. Thus, for each direction along the 360 degrees of the rotor plane a specific angular level of wind speed exists.

In the example illustrated in FIG. 3, a "hot spot" of very high speeds at the "east" side, i.e. the right-hand side of the swept area of the rotor blades, as seen from the front towards the wind turbine, exists.

Figure 4:
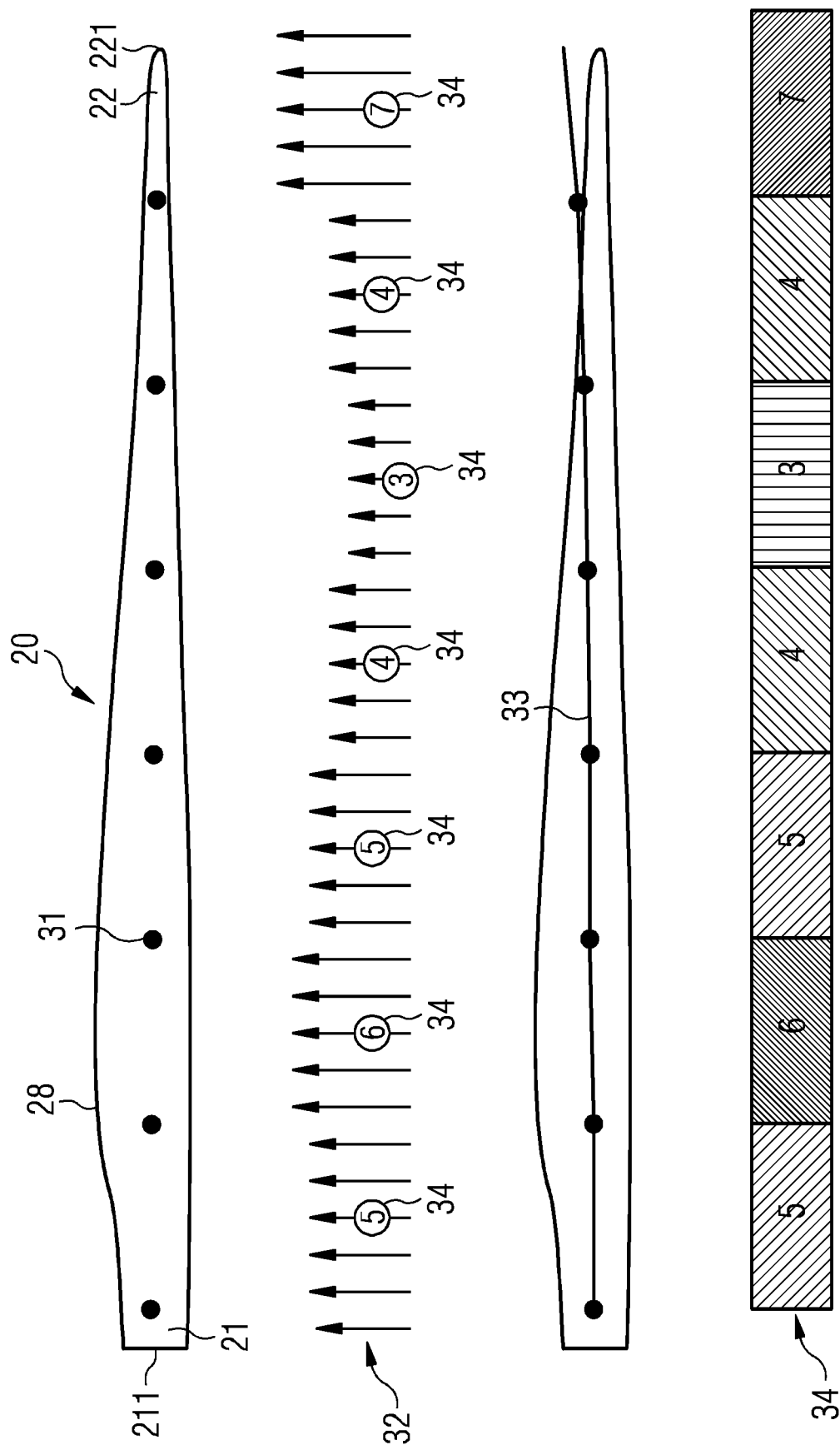
FIG. 4 shows a rotor blade equipped with a plurality of strain measurement devices arranged along the span of the rotor blade.

FIG. 4 shows another embodiment of the invention wherein a plurality of strain measurement devices 31 is attached along the span of a rotor blade 20. Assuming an inhomogeneous airflow impinging on the rotor blade 20, this leads to different strain values determined by each of the strain measurement devices 31. Taking the input data of the different strain measurement devices 31, different wind speeds are calculated depending on the radial position. The radial position refers to the distance away from the root 211 of the rotor blade 20. In the example of FIG. 4, the wind speed is highest around the shoulder 28 of the rotor blade (cf. value "6" of an arbitrary scale of wind speeds reaching from "1"—very low wind speeds—until "7"—very high wind speeds) and at the tip section 22 (cf. value "7"). It can also be seen that in the example of FIG. 4 the wind speed distribution is relatively inhomogeneous along the span of the rotor blade.

Using a similar rotor blade as shown in FIG. 4 in a wind turbine 10 leads to a fine detailed wind speed distribution at the rotor plane of the rotor blades.

Figure 5:
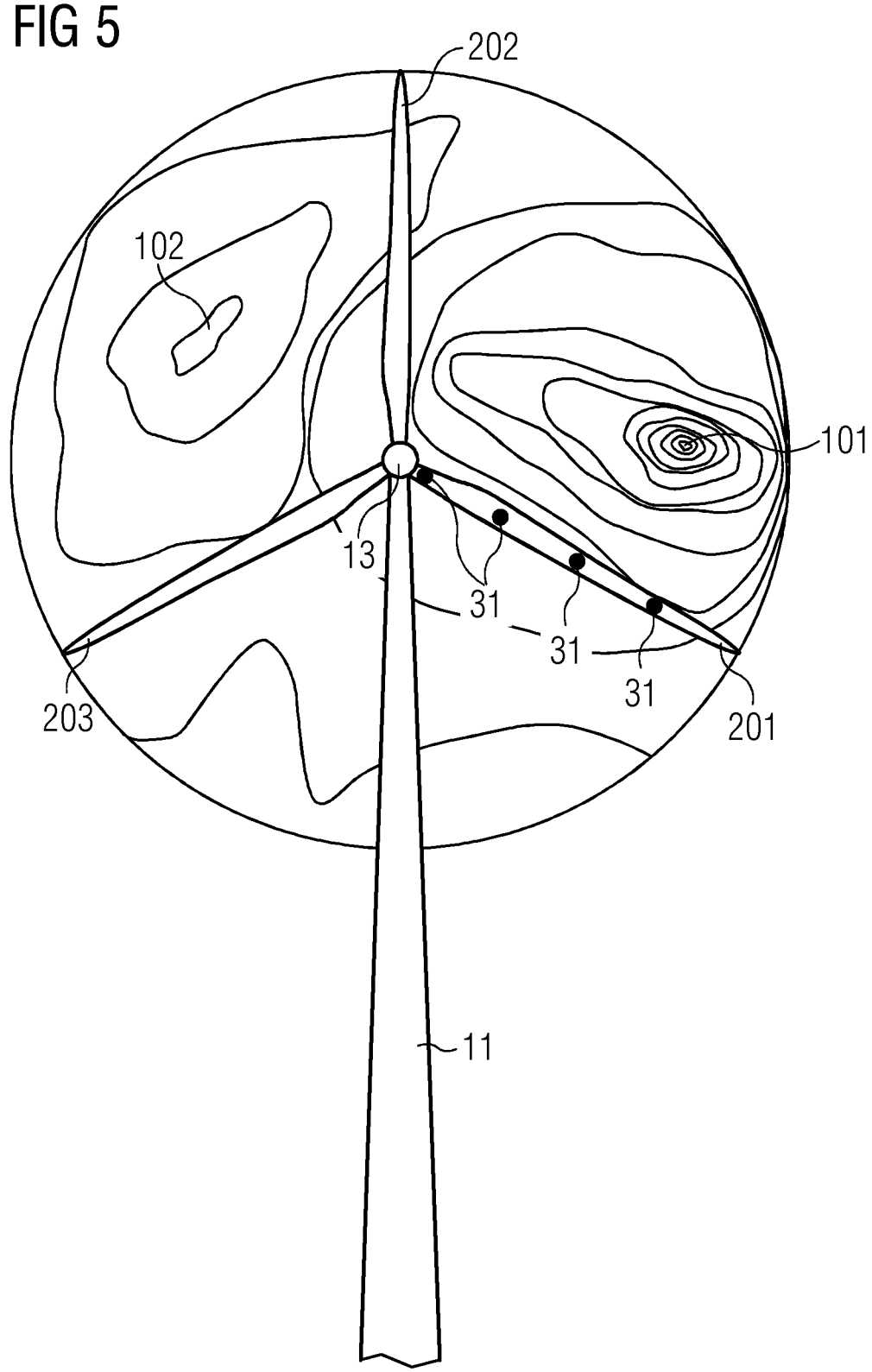
FIG. 5 shows a wind turbine with a plurality of strain measurement devices arranged on one of the rotor blades and a calculated corresponding wind field.

FIG. 5 shows a first rotor blade 201 equipped with four strain measurement devices 31 at different radial positions. Alternatively, the second rotor blade 202 and the third rotor blade 203 may also be equipped with strain measurement devices 31.

Note that the information regarding the wind field may directly be used by the controller or another component of the wind turbine to influence and control certain components of the wind turbine such that the overall performance of the wind turbine is optimized. Apart of this, the mere information about the wind field already gives a valuable insight which is otherwise very difficultly, if ever, obtainable at a wind turbine during operation.

In FIG. 5, another way of visualizing the wind field is chosen. The density of the depicted contour lines (in other words: level curves) relate to the level of intensity of the wind speeds. Again, a "hot spot" 101 of very high wind speeds at the "east" side, i.e. the right-hand side of the swept area of the rotor blades, as seen from the front towards the wind turbine, exists. Additionally, a second much weaker "hot spot" 102 in the upper left corner of swept area of the rotor plane is detected.

Compared to the wind field as obtained by one single strain measurement device per rotor blade, the wind field as obtained by a plurality of strain measurement devices situated at different spanwise positions of the rotor blade gives additionally a radial information regarding the determined wind speeds.

Note as well that apart of pitching individually a rotor blade of the wind turbine because of a local variation, also a global anomalous value of the wind speed can be identified. Thus, a principle suboptimal control or suboptimal alignment of the wind turbine can be identified. For instance, a principle yaw error can be identified by the proposed method and can be improved by yawing the nacelle or pitching the rotor blades.

In the following, it is disclosed how calculation from the measured strain values to the wind speeds may be performed and which additional information can be extracted.

Figure 6:
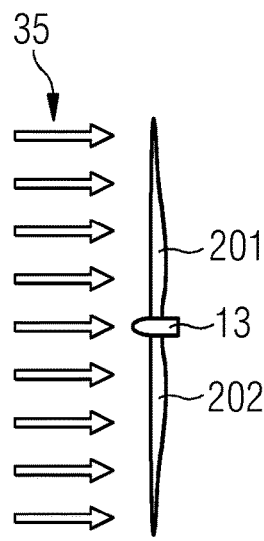
FIG. 6 shows two rotor blades being impinged by an airflow with uniform low wind speed.
Figure 7:
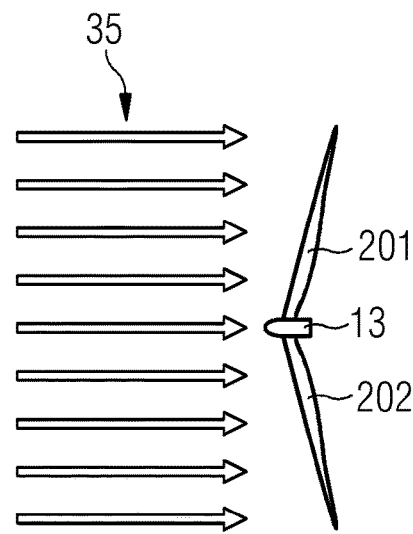
FIG. 7 shows two rotor blades being impinged by an airflow with uniform high wind speed.
Figure 8:
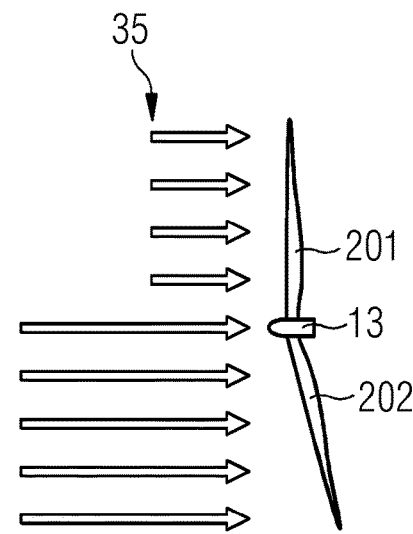
FIG. 8 shows two rotor blades being impinged by an airflow with non-uniform wind speed.

FIGS. 6 to 8 show different scenarios how the rotor blades of a wind turbine may exemplarily be bent.

FIG. 6 illustrates a first scenario, where an airflow 35 with low wind speed impinges uniformly on a first rotor blade 201 being connected to a hub 13 of a wind turbine and a second rotor blade 202 being also connected to the hub 13. Consequently, both rotor blades 201, 202 experience only a small thrust force and are only bent away to a negligible extent by the impinging airflow 35.

FIG. 7 illustrates a second scenario, where an airflow 35 with high wind speed impinges uniformly on a first rotor blade 201 being connected to a hub 13 of a wind turbine and a second rotor blade 202 being also connected to the hub 13. Consequently, both rotor blades 201, 202 experience a considerable thrust force and are bent away to a considerable extent by the impinging airflow 35.

FIG. 8 illustrates a third scenario, where an airflow 35 impinges with low wind speed on a first rotor blade 201 being connected to a hub 13 of a wind turbine and with high wind speed on a second rotor blade 202 being connected to the hub 13. Consequently, the first rotor blade 201 experiences only a small thrust force and is only bent away to a negligible extent by the impinging airflow 35, while the second rotor blade 202 experiences a considerable thrust force and is bent away to a considerable extent by the impinging airflow 35.

In all cases, the bending of the rotor blade is measured by a strain measurement device 31, which is located at the root section 21 of the rotor blade.

Figure 9:
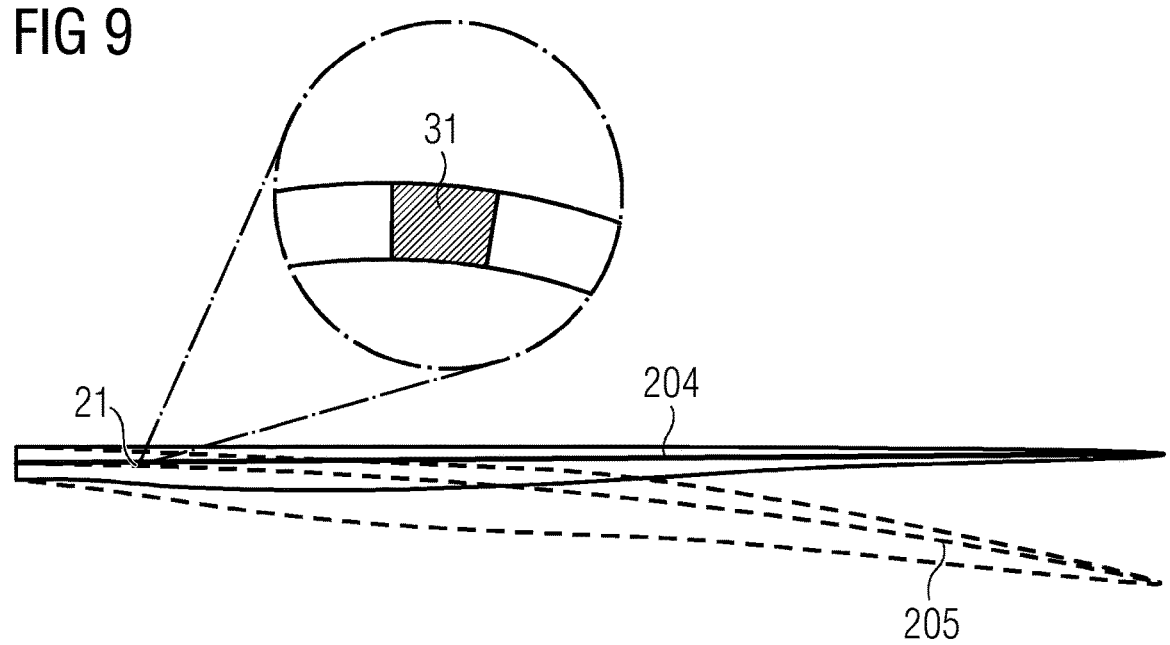
FIG. 9 shows a rotor blade with a strain measurement device in a bent and in an unbent state.

FIG. 9 illustrates a rotor blade in an unbent state 204, and sketches the same rotor blade in a bent state 205 (in dashed lines). The strain measurement device 31 produces a voltage which is proportional to the bending moment at the root section 21, which is also referred to as the root bending moment.

Figure 10:
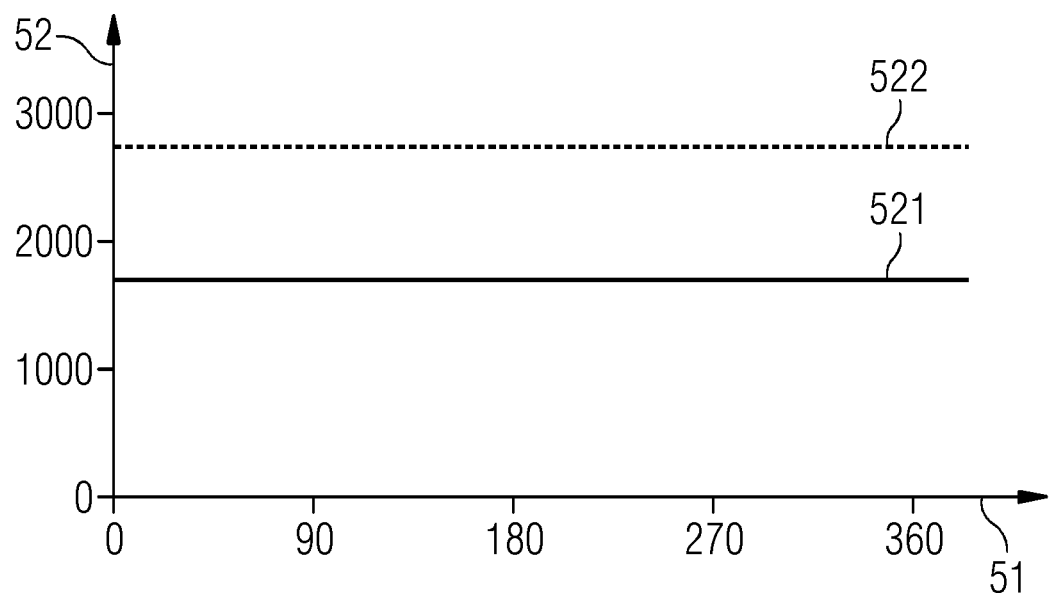
FIG. 10 shows the root bending moment of uniform airflows in Cartesian coordinates.
Figure 11:
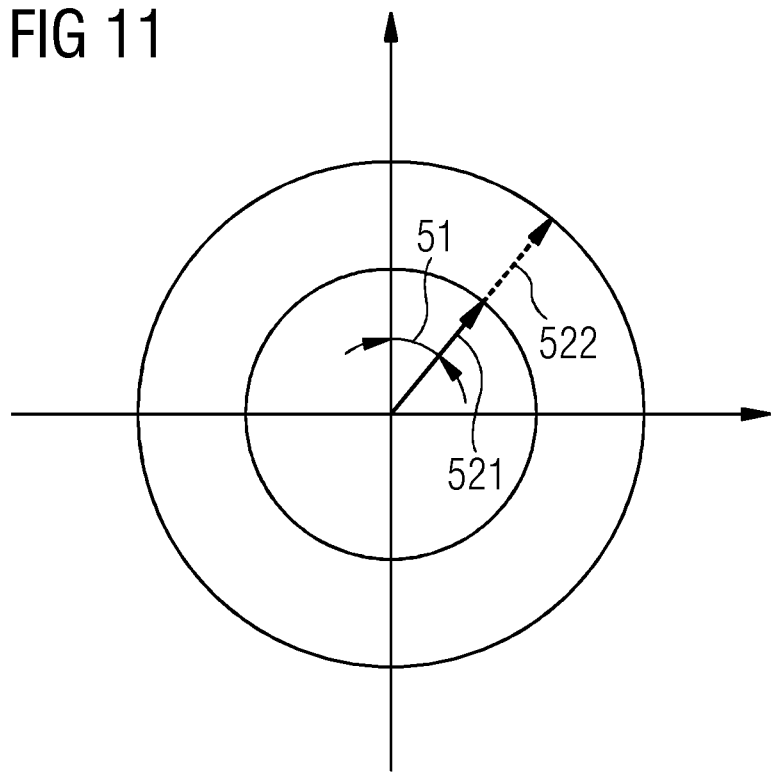
FIG. 11 shows the root bending moment of uniform airflows in polar coordinates.

FIGS. 10 and 11 illustrate how a low wind speed signal and a high wind speed signal translate into respective signals for the root bending moment in Cartesian coordinates and in polar coordinates, respectively.

For both the low wind speed scenario and the high wind speed scenario, an airflow which is uniform across the swept area and which impinges perpendicularly to the rotor plane on the rotor blades is assumed. Additionally, the wind speed is assumed to be constant during the measured time span such that a constant root bending moment is measured.

FIG. 10 illustrates the constant root bending moment in Cartesian coordinates, which is represented by a horizontal straight line. Note that the azimuth 51 is shown in degrees, thus, one full rotation of the rotor is obtained at 360 degrees. The root bending moment 52 is measured in kilo Newton times meter. The values for the root bending moment shown in FIG. 7 represent exemplary values for a three-bladed wind turbine of the Megawatt class.

The curve 521 represents the root bending moment for a low wind speed, while the curve 522 represents the root bending moment for a high wind speed. It is noted that for a stronger wind an increase of the constant root bending moment is translated into a rise of the horizontal line in Cartesian coordinates.

FIG. 11 illustrates the constant root moment in polar coordinates, which is represented by a circle centered at the origin of the polar coordinates.

Again, the curve 521 represents the root bending moment for a low wind speed, while the curve 522 represents the root bending moment for a high wind speed. As the wind speed is assumed to be constant during the observed time, which is at least one full rotation in FIG. 8, the curves 521, 522 have the shape of circles. It is noted that for a stronger wind an increase of the constant root bending moment is translated into an enlargement of the circle in polar coordinates.

FIGS. 9 and 10 illustrate an airflow which is impinging on the swept area 206 of the three rotor blades of a wind turbine 10, and which is non-uniform at this swept area 206. In FIG. 9, a high wind speed at the top 53 and a low wind speed at the bottom 54 of the swept area 206 is assumed, while in FIG. 10, a low wind speed at the left-hand side 54 and a high wind speed at the right-hand side 53 of the swept area 206 is assumed. Descriptively speaking, this results in a vertical or horizontal push-pull effect, respectively.

Figure 12:
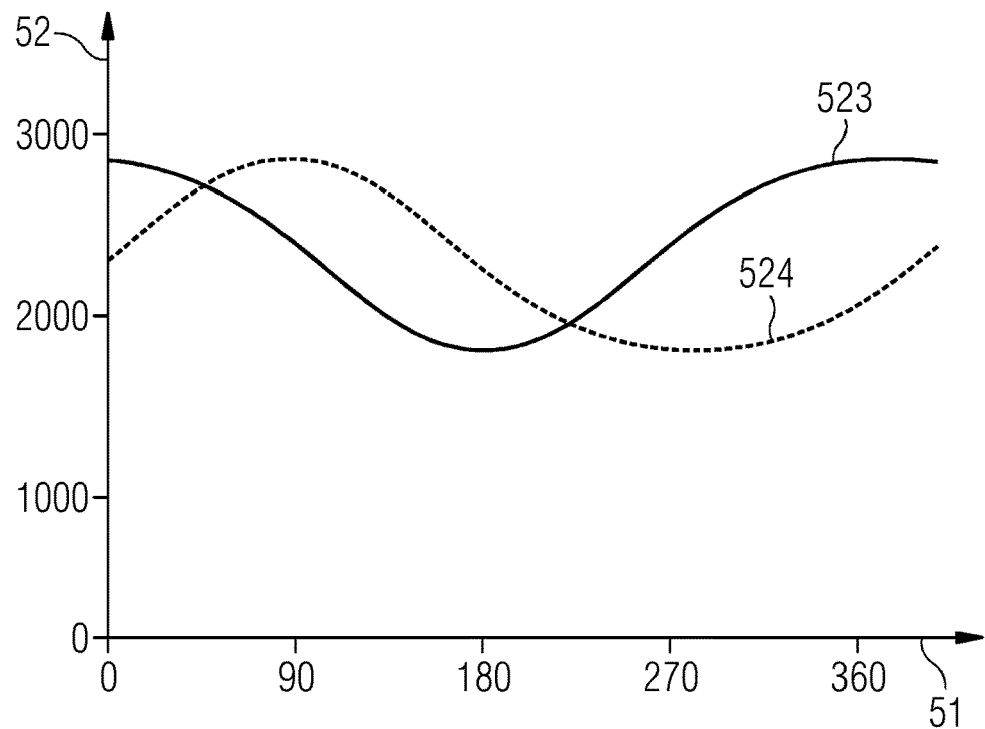
FIG. 12 shows the root bending moment of non-uniform airflows in Cartesian coordinates.

FIG. 12 shows the root bending moment 52 depending on the azimuth 51 for two scenarios of an airflow with non-uniform wind speeds. The curve 523 represents a scenario with a high wind speed at the top and a low wind speed at the bottom of the swept area 206 of the rotor blades. The curve 524 represents a scenario with a low wind speed at the left-hand side and a high wind speed at the right-hand side of the swept area 206 of the rotor blades. It is noted that the curve 523 can be described by a cosine function, while the curve 523 can be described by a sine function.

Figure 13:
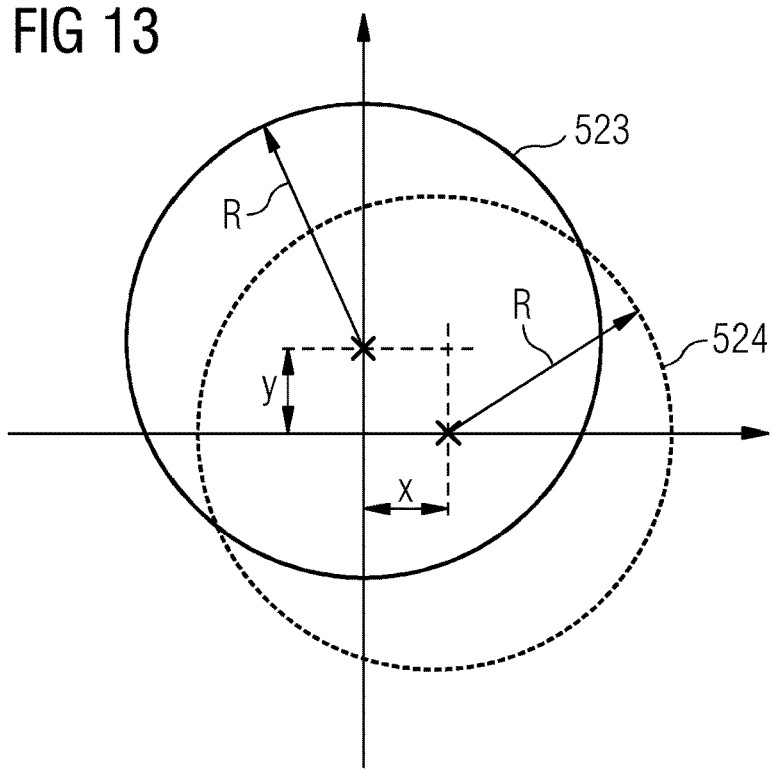
FIG. 13 shows the root bending moment of non-uniform airflows in polar coordinates.

FIG. 13 shows both curves 523, 524 in polar coordinates. A vertical push-pull effect produces a vertically-offset circle 523 in polar coordinates (cf. the vertical offset Y of the origin), while a horizontal push-pull effect produces a horizontally-offset circle 524 in polar coordinates (cf. the horizontal offset X of the origin).

A scenario for an arbitrary airflow impingement upon the swept area of the rotor blades is illustrated in FIG. 14.

The swept area of a wind turbine with a first rotor blade, a second rotor blade and a third rotor blade is impinged by an airflow which is non-uniform across the swept area. Note, however, that the airflow is assumed to be constant during the observation time, i.e. during at least one full rotation of rotor.

FIG. 14 shows the resulting signal 525 of the root bending moment in polar coordinates. The resulting signal is a circle comprising a radius R, which can be associated with the size of the root-bending moment, a horizontal offset X, which can be associated with a horizontal push-pull pull effect, and a vertical offset Y, which can be associated with a vertical push-pull effect.

If each of the three rotor blades were equipped with a respective strain measurement device at the root section of the respective rotor blade, a simultaneous measurement of the root bending moments of the rotor blades could be obtained. This has the advantage that at any time three measurement values for the root bending moment are obtained, wherein the first measurement value 91 relates to the first rotor blade, the second measurement value 92 relates to the second rotor blade and the third measurement value 93 relates to the third rotor blade. Each measurement value is separated by one hundred and twenty degrees from each other, thus the definition of a circle is possible, whose parameters R, X and Y can subsequently be extracted.

In order to extract concrete values for the wind speed based on the obtained values for the root bending moment, simulations were performed with the simulation tool BHawC. A uniform inflow of wind, i.e. without any turbulences, has been assumed and many systematic asymmetries, such as gravity, tower shadow, main shaft tilt, etc. have been disregarded. Thus, the only variables that were changed from simulation to simulation were (1) wind speed v, (2) yaw misalignment $\theta$, and (3) wind shear power-law exponent $\alpha$.

The results of those simulations show that in the variable-speed region of the wind turbine's operation, i.e. wind speeds between 5 m/s and 10 m/s, a single-valued function can describe the average root bending moment for all wind speeds in this region. This means that for any measured root bending moment, one could back-calculate the wind speed as it is single-valued. This negligible impact of the wind shear and the yaw misalignment on the average root bending moment in the mentioned range of wind speeds has been observed for wind shear power-law exponents between 0 and 0.3, and for yaw misalignments between −10 degrees and 10 degrees.

Once the wind speed has been established, the other two signals, namely X and Y, relating to the wind shear and the yaw misalignment can be extracted.

For each curve and for all wind speeds between 5 m/s and 10 m/s, the following equations are valid:

$Y = m_Y \theta + n_Y \alpha$ $X = m_X \theta + n_X \alpha$ where the 'm' values and 'n' values above are constants. Written in matrix form, this results in:

$$\begin{vmatrix} Y \\ X \end{vmatrix} = \begin{vmatrix} m_Y & n_Y \\ m_X & n_X \end{vmatrix} \begin{vmatrix} \theta \\ \alpha \end{vmatrix}$$

Thus, for a known wind speed, a measurement of X and Y can yield a yaw misalignment and wind shear value from matrix inversion and multiplication.

The 'm' and 'n' values have to be obtained once for each wind speed, for instance via the simulation tool BHawC, such that a lookup table can be generated. In this way, measurements of X, Y, and R produce values for wind speed, yaw misalignment, and wind shear.

The invention claimed is:

1. A method of controlling a wind turbine comprising a nacelle, a rotor, a rotating hub, a first rotor blade and at least a second rotor blade, both rotor blades being mounted to the hub, the second rotor blade trailing the first rotor blade in a rotor plane of the wind turbine, the method comprising:
measuring a strain in the first rotor blade at a first angular position within the rotor plane using at least one strain measurement device attached to the first rotor blade;

calculating a speed of an impinging airflow at the first angular position based at least on the measured strain in the first rotor blade at the first angular position;

determining a rotational speed of the rotor;

calculating an expected time needed by the second rotor blade to reach the first angular position within the rotor plane, wherein the calculation is carried out based on the determined rotational speed of the rotor and the angle between the first rotor blade and the second rotor blade; and changing an orientation of the second rotor blade to an optimized orientation within the expected time such that the second rotor blade is in the optimized orientation before reaching the first angular position, wherein the optimized orientation is selected based on the calculated speed of the impinging airflow at the first angular position to achieve a goal selected from the group consisting of reducing fatigue damage on the second rotor blade, increasing overall performance of the wind turbine, and combinations thereof.

2. The method according to claim 1, wherein the orientation of the second rotor blade is changed by pitching the second rotor blade.

3. The method according to claim 1, wherein the orientation of the second rotor blade is changed by yawing the nacelle of the wind turbine.

4. The method according to claim 1, further comprising:

calculating a second expected time needed by a third rotor blade of the wind turbine to reach the first angular position within the rotor plane, wherein the calculation is carried out based on the determined rotational speed of the rotor and the angle between the first rotor blade and the third rotor blade, and changing an orientation of the third rotor blade to a second optimized orientation within the second expected time such that the third rotor blade is in the second optimized orientation before reaching the first angular position, wherein the second optimized orientation is selected based on the speed of the impinging airflow at the first angular position to achieve a goal selected from the group consisting of reducing fatigue damage on the third rotor blade, increasing overall performance of the wind turbine, and combinations thereof.

5. The method according to claim 1, wherein a plurality of strain measurement devices are arranged along the span of the first rotor blade between the root portion of the first rotor blade and the tip portion of the first rotor blade; and wherein the method comprises obtaining a plurality of strain measurements along the span of the first rotor blade using the plurality of strain measurement devices;

calculating a speed distribution of the impinging airflow along the first rotor blade at the first angular position based at least on the plurality of strain measurements; and wherein the optimized orientation is selected based on the calculated speed distribution of the impinging airflow at the first angular position.

6. The method according to claim 1, wherein the strain in all rotor blades of the wind turbine are measured by respective strain measurement devices attached to the respective rotor blades.

7. A wind turbine, comprising:

a nacelle; a rotor; a rotating hub; a first rotor blade; at least a second rotor blade, both rotor blades being mounted to the hub, the second rotor blade trailing the first rotor blade in a rotor plane of the wind turbine;

at least one strain measurement device attached to the first rotor blade for measuring a strain in the first rotor blade at a first radial position along the first rotor blade and at a first angular position within the rotor plane; and a controller adapted to calculate a speed of an impinging airflow at the first angular position based at least on the measured strain in the first rotor blade at the first angular position;

determine a rotational speed of the rotor, to calculate an expected time needed by the second rotor blade to reach the first angular position within the rotor plane, wherein the calculation is carried out based on the determined rotational speed of the rotor and the angle between the first rotor blade and the second rotor blade, and to change an orientation of the second rotor blade to an optimized orientation within the expected time such that the second rotor blade is in the optimized orientation before reaching the first angular position, wherein the optimized orientation is selected based on the calculated speed of the impinging airflow at the first angular position to achieve a goal selected from the group consisting of reducing fatigue damage on the second rotor blade, increasing overall performance of the wind turbine, and combinations thereof.

8. The wind turbine according to claim 7, wherein the strain measurement device is arranged at the root portion of the first rotor blade.

9. The wind turbine according to claim 7, wherein a plurality of strain measurement devices are arranged along the span of the first rotor blade between the root portion of the first rotor blade and the tip portion of the first rotor blade.

10. The wind turbine according to claim 9, wherein the strain measurement devices are connected via optical fibers or wireless with each other.

11. A wind turbine which is controlled by the method according to claim 1.

12. The wind turbine according to claim 11, further comprising a controller adapted to control the wind turbine.

* * * * *